US011803616B2

(12) United States Patent
He et al.

(10) Patent No.: US 11,803,616 B2
(45) Date of Patent: Oct. 31, 2023

(54) FUNCTION TESTING FOR MOVABLE OBJECTS IN SAFETY CRITICAL APPLICATIONS WITH SPATIAL REPRESENTATION LEARNING AND ADVERSARIAL GENERATION

(71) Applicant: Robert Bosch GmbH, Stuttgart (DE)

(72) Inventors: Wenbin He, Sunnyvale, CA (US); Liang Gou, San Jose, CA (US); Lincan Zou, San Jose, CA (US); Liu Ren, Saratoga, CA (US)

(73) Assignee: Robert Bosch GmbH, Stuttgart (DE)

( * ) Notice: Subject to any disclaimer, the term of this patent is extended or adjusted under 35 U.S.C. 154(b) by 299 days.

(21) Appl. No.: 17/188,907

(22) Filed: Mar. 1, 2021

(65) Prior Publication Data

US 2022/0277173 A1 Sep. 1, 2022

(51) Int. Cl.
| | | |
|---|---|---|
| *G06N 3/08* | (2023.01) | |
| *G06F 18/21* | (2023.01) | |
| *G06N 3/088* | (2023.01) | |
| *G06V 10/25* | (2022.01) | |
| *G06V 20/56* | (2022.01) | |
| *G06F 18/214* | (2023.01) | |
| *G06N 3/045* | (2023.01) | |

(52) U.S. Cl.
CPC .......... *G06F 18/217* (2023.01); *G06F 18/214* (2023.01); *G06N 3/045* (2023.01); *G06N 3/088* (2013.01); *G06V 10/25* (2022.01); *G06V 20/56* (2022.01)

(58) Field of Classification Search
CPC ..... G06F 18/217; G06F 18/214; G06V 10/25; G06V 20/56; G06K 9/00; G06K 9/62; G06K 9/32; G06K 9/6262; G06K 9/00791; G06K 9/6256; G06K 9/3233; G06N 3/08; G06N 3/045; G06N 3/04; G06N 3/088; G06N 3/0454
See application file for complete search history.

(56) References Cited

U.S. PATENT DOCUMENTS

2022/0253714 A1* 8/2022 Chen ...................... G06N 3/088

OTHER PUBLICATIONS

Duan et al., "Adversarial Camouflage: Hiding Physical-World Attacks with Natural Styles", CVPR 2020, 9 pages.
Goodfellow et al., "Generative Adversarial Networks," Advances in Neural Information Processing Systems, vol. 27, Jun. 2014, 9 pages.

(Continued)

*Primary Examiner* — Tuan H Nguyen
(74) *Attorney, Agent, or Firm* — Michael Best & Friedrich, LLP

(57) ABSTRACT

Methods and systems for performing function testing for moveable objects. One system includes an electronic processor configured to access a driving scene including a moveable object. The electronic processor is also configured to perform spatial representation learning on the driving scene. The electronic processor is also configured to generate an adversarial example based on the learned spatial representation. The electronic processor is also configured to retrain the deep learning model using the adversarial example and the driving scene.

18 Claims, 9 Drawing Sheets

(56) References Cited

OTHER PUBLICATIONS

Gou et al., "VATLD: A Visual Analytics System to Assess, Understand and Improve Traffic Light Deteciton", IEEE Transactions on Visualization and Computer Graphics, 2020, pp. 261-271.
Higgins et al., "beta-VAE: Learning basic visual concepts with a constrained variational framework," ICLR, 2017, 22 pages.
Kingma et al., "Auto-Encoding Variational Bayes", ICLR, May 2014, 14 pages.
Li et al., "Learning the Distributions of Adversarial Examples for an Improved Black-Box Attack on Deep Neural Networks", Proceedings of the 36th International Conference on Machine Learning, Dec. 2019, 11 pages.
Papernot et al., "Practical Black-Box Attacks Against Machine Learning", Proceedings of the 2017 ACM Asia Conference on Computer and Communications Security, Mar. 2017, 14 pages.
Perez et al., "Poisson Image Editing", ACM SIGGRAPH, 2003, pp. 313-318.
Sohn et al., "Learning Structured Output Representation using Deep Conditional Generative Models", NIPS Proceedings, 2015, 9 pages.
Szegedy et al., "Intriguing properties of neural networks," Feb. 2014, 10 pages.
Wang et al. "AT-GAN: A Generative Attack Model for Adversarial Transferring on Generative Adversarial Nets", 2019, 15 pages.

* cited by examiner

Accuracy

| Model | mIoU | IoU (Lost Cargo) | IoU (Road) | IoU (Background) |
|---|---|---|---|---|
| Base | 0.807185 | 0.563066 | 0.884330 | 0.974158 |
| Adv Attack | 0.814472 | 0.596567 | 0.874451 | 0.972398 |

Robustness

| Model | mIoU | IoU (Lost Cargo) | IoU (Road) | IoU (Background) |
|---|---|---|---|---|
| Base | 0.823507 | 0.532173 | 0.949682 | 0.988667 |
| Adv Attack | 0.865589 | 0.652594 | 0.954558 | 0.989615 |

FIG. 8

FUNCTION TESTING FOR MOVABLE OBJECTS IN SAFETY CRITICAL APPLICATIONS WITH SPATIAL REPRESENTATION LEARNING AND ADVERSARIAL GENERATION

FIELD

Embodiments relate to function testing for movable objects in autonomous driving with spatial representation learning and adversarial generation.

SUMMARY

Examining the robustness and potential vulnerability of deep learning models plays an increasingly important role in various real-world applications, especially in safety-critical applications, such as advanced driver assistance systems ("ADASs") and autonomous driving (which are collectively referred to herein as "autonomous driving"). Deep learning models have become fundamental building blocks for autonomous driving systems, which have been applied on various tasks, such as object detection and semantic segmentation. Although the performance of deep learning models keeps improving, deep learning models are known to be vulnerable to adversarial examples or edge cases. Hence, function testing becomes critical to ensure the robustness of deep learning models.

Recently, adversarial attack has shown some potentials for function testing in autonomous driving systems (for example, generating adversarial examples by changing the style of the input images to fail image classifiers, performing function testing on traffic light detection models by perturbing the appearance of traffic lights using adversarial search, and the like). The advantage of using adversarial attack to perform function testing on deep learning models is that failure cases may be identified efficiently and may be used to improve the robustness, accuracy, or a combination thereof of deep learning models.

Although, previous efforts utilizing adversarial attack to improve the robustness of deep learning models have shown promising results on specific applications, there are still some limitations to apply those methods for autonomous driving. First, most of the previous works cannot provide adversarial examples with semantic meanings because those methods generate adversarial examples by adding noise into the inputs, which are not interpretable by humans. Hence, the adversarial examples generated by those methods lack physical or semantic meanings for humans to understand the potential vulnerability of the deep learning models. Several recent techniques have been proposed to address this issue by first learning a semantic representation of input images and then attacking the representation space instead of the original space. However, the limited capability of the representation learning methods limits the generality of those methods. For example, it is challenging to learn the representation of complex drive scenes and most of the previous efforts focused on specific objects, such as traffic lights and traffic signs. Moreover, those methods are limited to stationary objects because it is challenging to model the representation of the object's position, size, and apparency simultaneously, in complex drive scenes.

To solve these and other problems, embodiments described herein provide, among other things, methods and systems for generating adversarial examples of movable objects for function testing of deep learning models for autonomous driving. Detection and/or segmentation of movable objects play an important role in autonomous driving and have wide applications, such as tracking and motion prediction. For example, the embodiments described herein learn a representation of an object's position and size and then use the learned representation to guide the generation of one or more adversarial examples. Given the generated adversarial examples, the embodiments identify the failure patterns of a target deep learning model and improve the target deep learning model by retraining the target deep learning model using original driving scenes and the generated adversarial examples. The proposed method may be evaluated on various types of moveable objects (for example, lost cargo, pedestrians, and the like) for different deep learning models (for example, an object detection model, a semantic segmentation model, or the like).

For example, one embodiment provides a system for performing function testing for moveable objects. The system includes an electronic processor configured to access a driving scene including a moveable object. The electronic processor is also configured to perform spatial representation learning on the driving scene. The electronic processor is also configured to generate an adversarial example based on the learned spatial representation. The electronic processor is also configured to retrain the deep learning model using the adversarial example and the driving scene.

Another embodiment provides a method for performing function testing for moveable objects. The method includes accessing a driving scene including a moveable object. The method also includes performing, with an electronic processor, spatial representation learning on the driving scene. The method also includes generating, with the electronic processor, an adversarial example based on the learned spatial representation learning. The method also includes retraining, with the electronic processor, the deep learning model using the adversarial example and the driving scene.

Yet another embodiment provides a non-transitory, computer-readable medium storing instructions that, when executed by an electronic processor, perform a set of functions. The set of functions includes accessing a driving scene including a moveable object. The set of functions also includes performing spatial representation learning on the driving scene. The set of functions also includes generating an adversarial example based on the learned spatial representation. The set of functions also includes retraining the deep learning model using the adversarial example and the driving scene.

Other aspects and embodiments will become apparent by consideration of the detailed description and accompanying drawings.

BRIEF DESCRIPTION OF THE DRAWINGS

FIG. 8 illustrates an example table indicating a performance of a deep learning model according to some embodiments.

DETAILED DESCRIPTION

Before any embodiments are explained in detail, it is to be understood the embodiments are not limited in their application to the details of construction and the arrangement of components set forth in the following description or illustrated in the following drawings. Other embodiments are possible and embodiments described and/or illustrated here are capable of being practiced or of being carried out in various ways.

It should also be noted that a plurality of hardware and software-based devices, as well as a plurality of different structural components may be used to implement the embodiments described herein. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the embodiments described herein may be implemented in software (for example, stored on non-transitory computer-readable medium) executable by one or more electronic processors. As such, it should be noted that a plurality of hardware and software-based devices, as well as a plurality of different structural components may be utilized to implement various embodiments. It should also be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Figure 1:
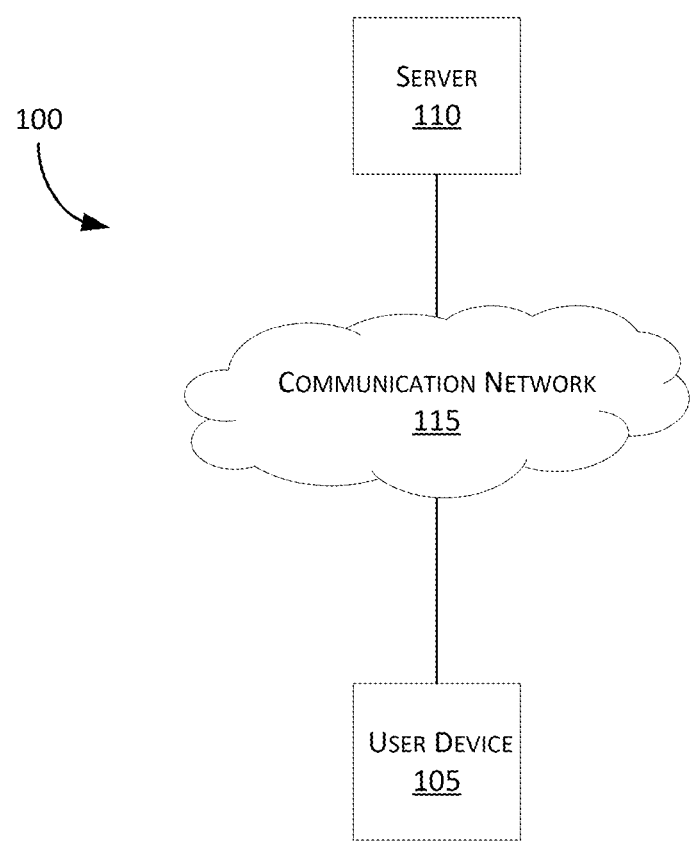
FIG. 1 schematically illustrates a system for performing function testing for moveable objects according to some embodiments.

FIG. 1 illustrates a system 100 for performing function testing for moveable objects according to some embodiments. In the illustrated example, the system 100 includes a user device 105 and a server 110. In some embodiments, the system 100 includes fewer, additional, or different components than illustrated in FIG. 1. For example, the system 100 may include multiple user devices 105, multiple servers 110, or a combination thereof.

The user device 105 and the server 110 communicate over one or more wired or wireless communication networks 115. Portions of the communication networks 115 may be implemented using a wide area network, such as the Internet, a local area network, such as a Bluetooth™ network or Wi-Fi, and combinations or derivatives thereof. Alternatively or in addition, in some embodiments, components of the system 100 communicate directly with each other instead of communicating through the communication network 115. Also, in some embodiments, the components of the system 100 communicate through one or more intermediary devices not illustrated in FIG. 1.

Figure 2:
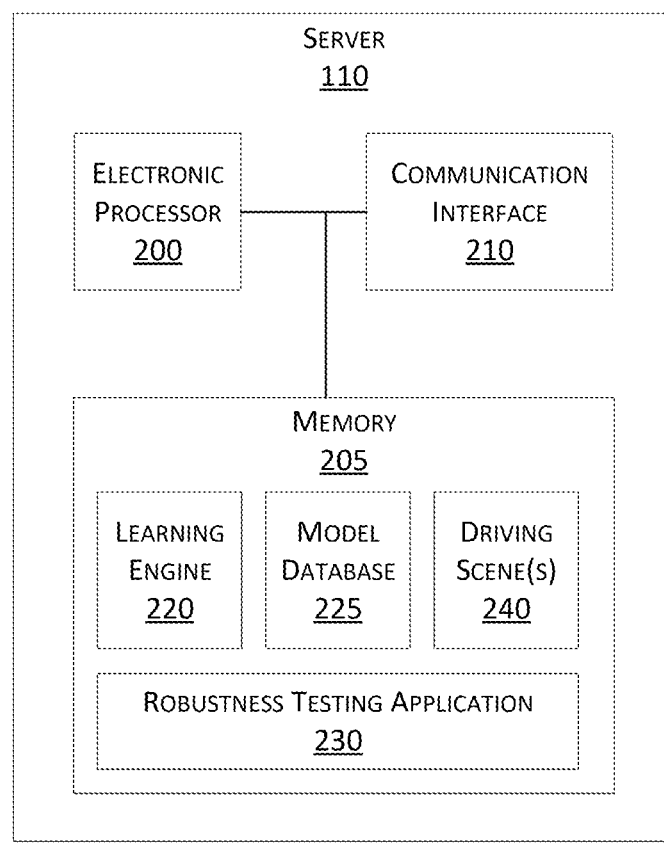
FIG. 2 schematically illustrates a server included in the system of FIG. 1 according to some embodiments.

The server 110 includes a computing device, such as a server, a database, or the like. As illustrated in FIG. 2, the server 110 includes an electronic processor 200, a memory 205, and a communication interface 210. The electronic processor 200, the memory 205, and the communication interface 210 communicate wirelessly, over one or more communication lines or buses, or a combination thereof. The server 110 may include additional components than those illustrated in FIG. 2 in various configurations. For example, the server 110 may also include one or more human machine interfaces, such as a keyboard, keypad, mouse, joystick, touchscreen, display device, printer, speaker, and the like, that receive input from a user, provide output to a user, or a combination thereof. The server 110 may also perform additional functionality other than the functionality described herein. Also, the functionality described herein as being performed by the server 110 may be distributed among multiple servers or devices (for example, as part of a cloud service or cloud-computing environment).

The communication interface 210 may include a transceiver that communicates with the user device 105 and the database 107 over the communication network 115 and, optionally, one or more other communication networks or connections. The electronic processor 200 includes a microprocessor, an application-specific integrated circuit ("ASIC"), or another suitable electronic device for processing data, and the memory 205 includes a non-transitory, computer-readable storage medium. The electronic processor 200 is configured to access and execute computer-readable instructions ("software") stored in the memory 205. The software may include firmware, one or more applications, program data, filters, rules, one or more program modules, and other executable instructions. For example, the software may include instructions and associated data for performing a set of functions, including the methods described herein.

For example, as illustrated in FIG. 2, the memory 205 may store a learning engine 220 and a model database 225. In some embodiments, the learning engine 220 develops one or more deep learning models using one or more machine learning functions. Machine learning functions are generally functions that allow a computer application to learn without being explicitly programmed. In particular, the learning engine 220 is configured to develop an algorithm or model based on training data. For example, to perform supervised learning, the training data includes example inputs and corresponding desired (for example, actual) outputs, and the learning engine progressively develops a model (for example, a deep learning model, such as an object detection model, a semantic segmentation model, or the like) that maps inputs to the outputs included in the training data. Machine learning performed by the learning engine 220 may be performed using various types of methods and mechanisms including, but not limited to, decision tree learning, association rule learning, artificial neural networks, inductive logic programming, support vector machines, clustering, Bayesian networks, reinforcement learning, representation learning, similarity and metric learning, sparse dictionary learning, and genetic algorithms. These approaches allow the learning engine 220 to ingest, parse, and understand data and progressively refine models for data analytics.

Models generated by the learning engine 220 are stored in the model database 225. As illustrated in FIG. 2, the model database 225 is included in the memory 205 of the server 110. However, in some embodiments, the model database 225 is included in a separate device accessible by the server 110 (included in the server 110 or external to the server 110).

Additionally, as illustrated in FIG. 2, the memory 205 includes a robustness testing application 220. The robustness testing application 220 is a software application executable by the electronic processor 200. As described in more detail below, the electronic processor 200 executes the robustness testing application 220 for performing function testing that examines the robustness and potential vulnerability of deep learning models (for example, one or more models stored in the model database 225) for a movable object (such as a moveable object in autonomous driving) using, for example, spatial representation learning and adversarial generation.

Figure 3:
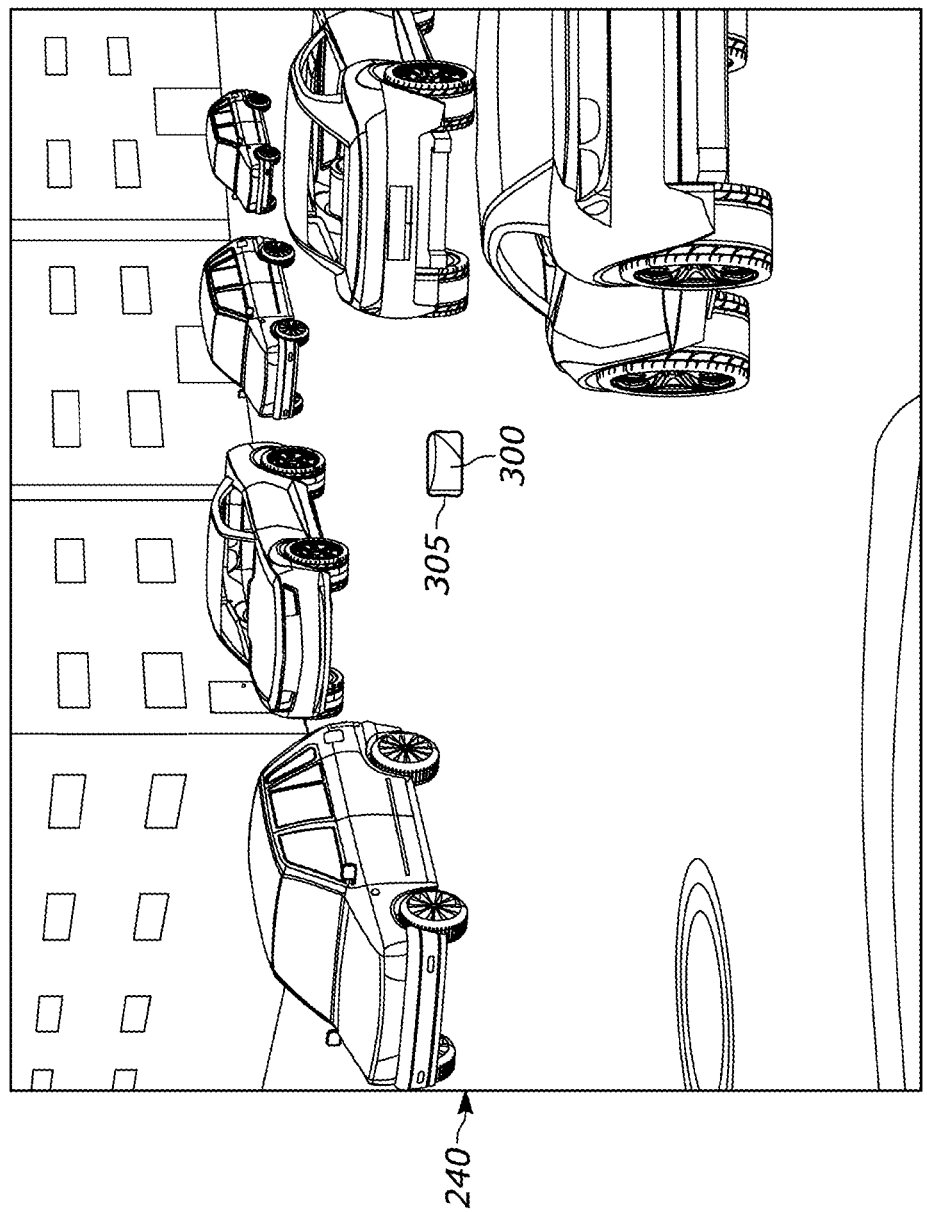
FIG. 3 illustrates an example driving scene according to some embodiments.

The memory 205 also includes a collection or set of driving scenes 240. In some embodiments, the driving scenes 240 are stored as images. However, in other embodiments, the driving scenes 240 may be stored as another type of media or data file. Each driving scene 240 may include one or more moveable objects, such as a piece of lost cargo, a pedestrian, or the like. As one example, FIG. 3 illustrates an example image of a driving scene 240. As seen in FIG. 3, the driving scene 240 includes a moveable object 300 positioned within a bounding box 305. Accordingly, in some embodiments, the driving scene 240 includes a bounding box representing (or positioned around) a moveable object (for example, the moveable object 300 and the bounding box 305, as illustrated in FIG. 3). In some embodiments, a deep learning model (for example, a model stored in the model database 225) recognizes or identify a moveable object in a driving scene and positioning or generates a bounding box around the moveable object. Although FIG. 2 illustrates the driving scenes 240 included in the memory 205 of the server 110, in some embodiments, the driving scenes 240 is included in a separate device accessible by the server 110 (included in the server 110 or external to the server 110, such as a separate training database).

The user device 105 also includes a computing device, such as a desktop computer, a laptop computer, a tablet computer, a terminal, a smart telephone, a smart television, a smart wearable, or another suitable computing device that interfaces with a user. The user device 105 may be used by an end user to interact with the robustness testing application 230. In some embodiments, the end user may interact with the robustness testing application 230 to perform function testing that examines the performance (for example, robustness and potential vulnerability) of a deep learning model (for example, a target deep learning model) for movable objects in autonomous driving, as described in greater detail below. Alternatively or in addition, the end user may use the user device 105 to interact with function testing results, such as a visual summary of the function testing (or adversarial attack) results, provided by the robustness testing application 230, as described in greater detail below.

Although not illustrated in FIG. 1, the user device 105 may include similar components as the server 110, such as electronic processor (for example, a microprocessor, an ASIC, or another suitable electronic device), a memory (for example, a non-transitory, computer-readable storage medium), a communication interface, such as a transceiver, for communicating over the communication network 115 and, optionally, one or more additional communication networks or connections, and one or more human machine interfaces. For example, to communicate with the server 110, the user device 105 may store a browser application or a dedicated software application executable by an electronic processor. The system 100 is described herein as providing a function testing service through the server 110. However, in other embodiments, the functionality described herein as being performed by the server 110 may be locally performed by the user device 115. For example, in some embodiments, the user device 105 may store the robustness testing application 230.

Figure 4:
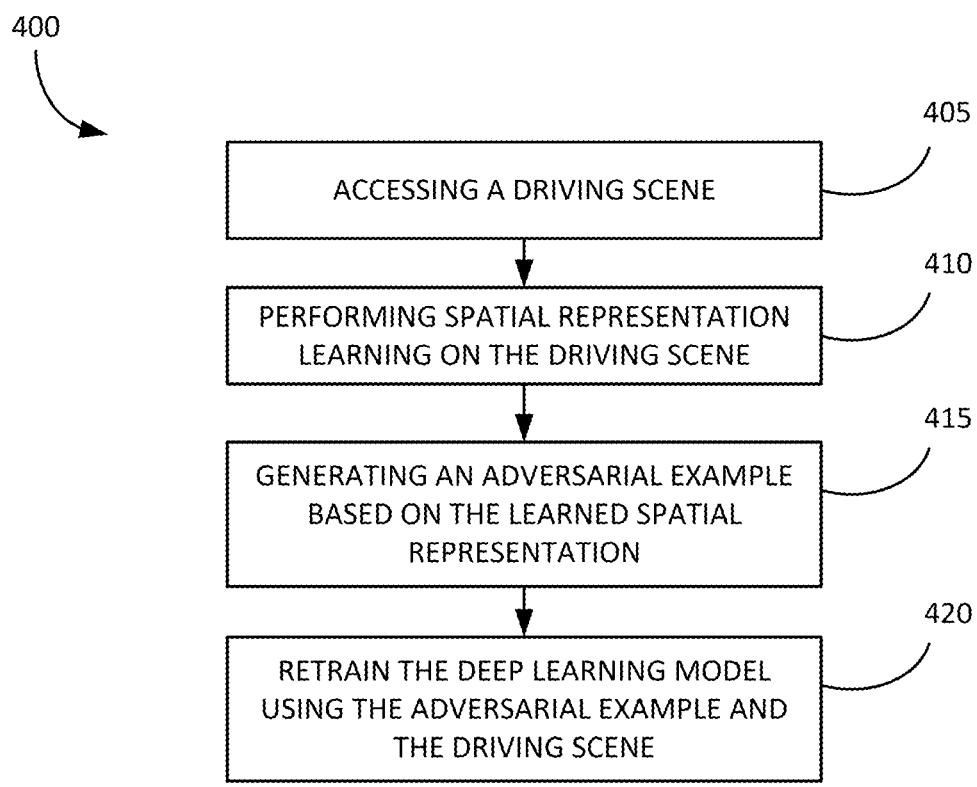
FIG. 4 is a flowchart illustrating a method for performing function testing for moveable objects performed by the system of FIG. 1 in accordance with some embodiments.

FIG. 4 is a flowchart illustrating a method 400 for performing function testing for moveable objects performed by the system 100 according to some embodiments. The method 400 is described as being performed by the server 110 and, in particular, the robustness testing application 230 as executed by the electronic processor 200. However, as noted above, the functionality described with respect to the method 400 may be performed by other devices, such as the user device 105, or distributed among a plurality of devices, such as a plurality of servers included in a cloud service.

As illustrated in FIG. 4, the method 400 includes accessing one or more driving scenes 240 (at block 405). As noted above, each driving scene 240 may include one or more moveable objects, such as a piece of lost cargo, a pedestrian, or the like. In some embodiments, the driving scene 240 includes a bounding box representing (or positioned around) a moveable object (for example, the moveable object 300 and the bounding box 305, as illustrated in FIG. 3). In some embodiments, the electronic processor 200 accesses the driving scene(s) 240 from the memory 205. Alternatively or in addition, the electronic processor 200 may access the driving scene(s) 240 from a separate device accessible by the server 110 (included in the server 110 or external to the server 110, such as a separate database).

Figure 5A:
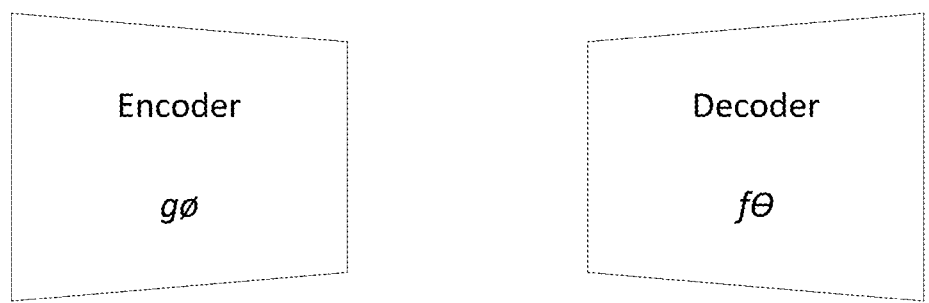
FIG. 5A illustrates a conditional variational autoencoder according to some embodiments.
Figure 5B:
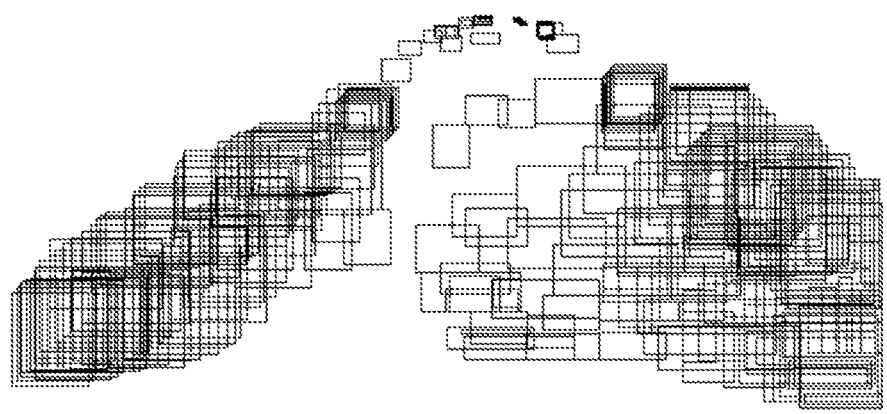
FIG. 5B illustrates a plurality of bounding boxes reconstructed by a decoder according to some embodiments.

As seen in FIG. 4, the electronic processor 200 then performs spatial representation learning on the driving scene 240 (at block 410). Given the drive scene 240 as a condition, the electronic processor 200 models the distribution of a position and size of the movable object (i.e., a bounding box of the moveable object) with a representation learning approach. Accordingly, in some embodiments, the electronic processor 200 performs the spatial representation learning using a representation learning approach, such as, for example, a conditional variational autoencoder, as shown in FIG. 5A. The representation learning approach trains an encoder that encodes the bounding boxes into latent representations and a decoder that reconstructs the bounding boxes given the latent representations and the conditions (i.e., the drive scenes 240). Accordingly, in some embodiments, the electronic processor 200 trains an encoder to encode a bounding box of a moveable object included in the driving scene 240 into a latent representation and trains a decoder to reconstruct the bounding box given the latent representation and the driving scene. After training the encoder and the decoder, the electronic processor 200 may obtain the distribution (or spatial distribution) of bounding boxes by sampling latent representations from the latent space and then reconstructing the bounding boxes with the decoder, as shown in FIG. 5B.

Figure 6:
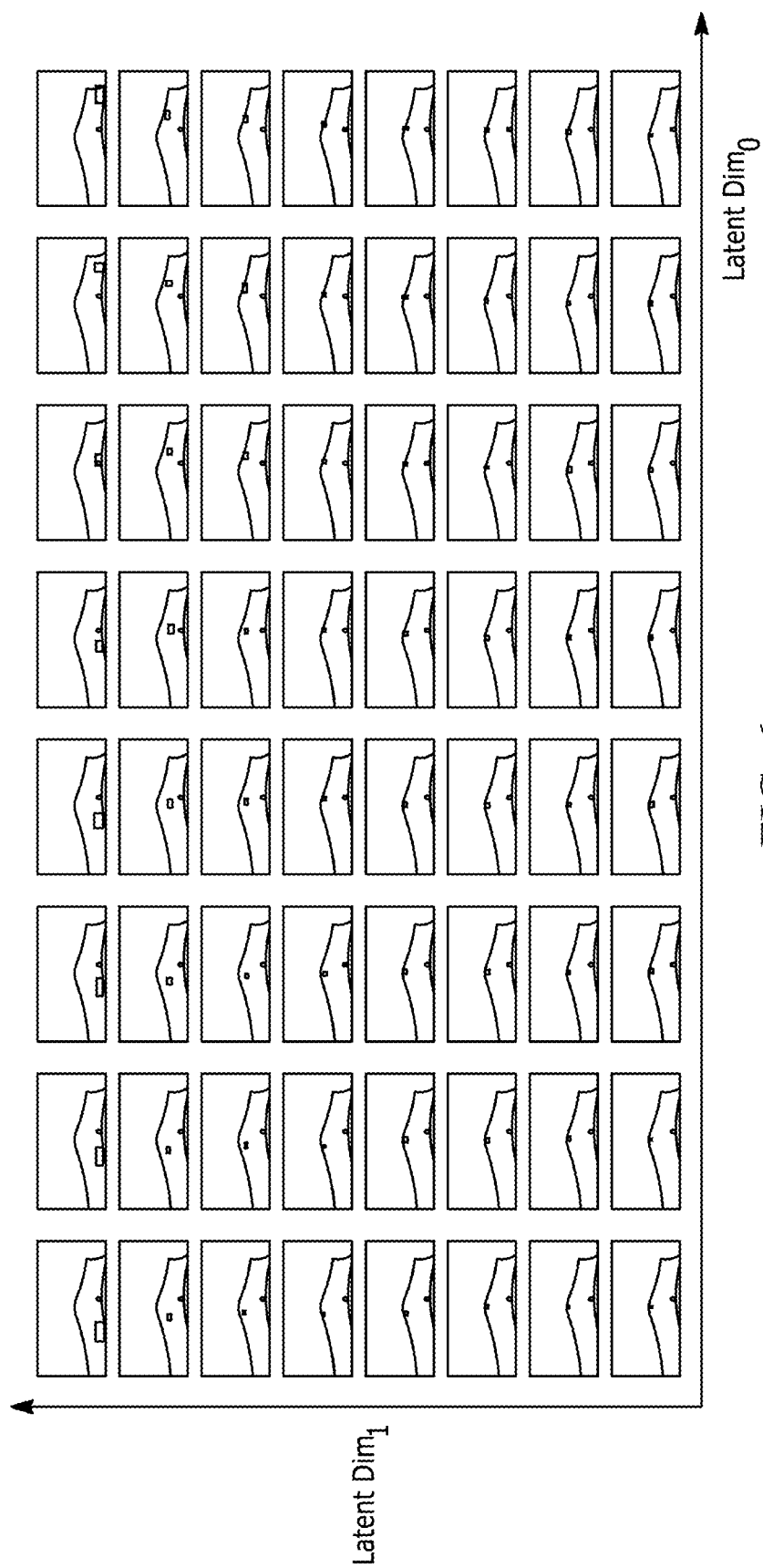
FIG. 6 graphically illustrates a distribution of learned spatial representations for a target moveable object according to some embodiments.

As described in greater detail below, the position and size of a target moveable object may be perturbed by perturbing its latent representation of the target moveable object with semantic meanings, which may be used (for example, by the electronic processor 200) in generating adversarial examples, as seen in FIG. 6. FIG. 6 illustrates a distribution of learned spatial representations for a target moveable object. For example, as shown in FIG. 6, a bounding box changes position and size along with the latent representation.

After performing the spatial representation learning on the driving scene 240 (at block 410), the electronic processor 200 generates an adversarial example based on the learned spatial representation (at block 415). In other words, in some embodiments, the electronic processor 200 performs semantic adversarial generation. In such embodiments, the semantic adversarial generation includes inserting a new moveable object into a given driving scene and perturbing a spatial representation of the new moveable object to fail a target deep learning model. Accordingly, in some embodiments, the electronic processor 200 generates the adversarial example by generating and inserting a new moveable object into the driving scene 240 and perturbing a spatial representation of the new moveable object within the driving scene 240.

Figure 7:
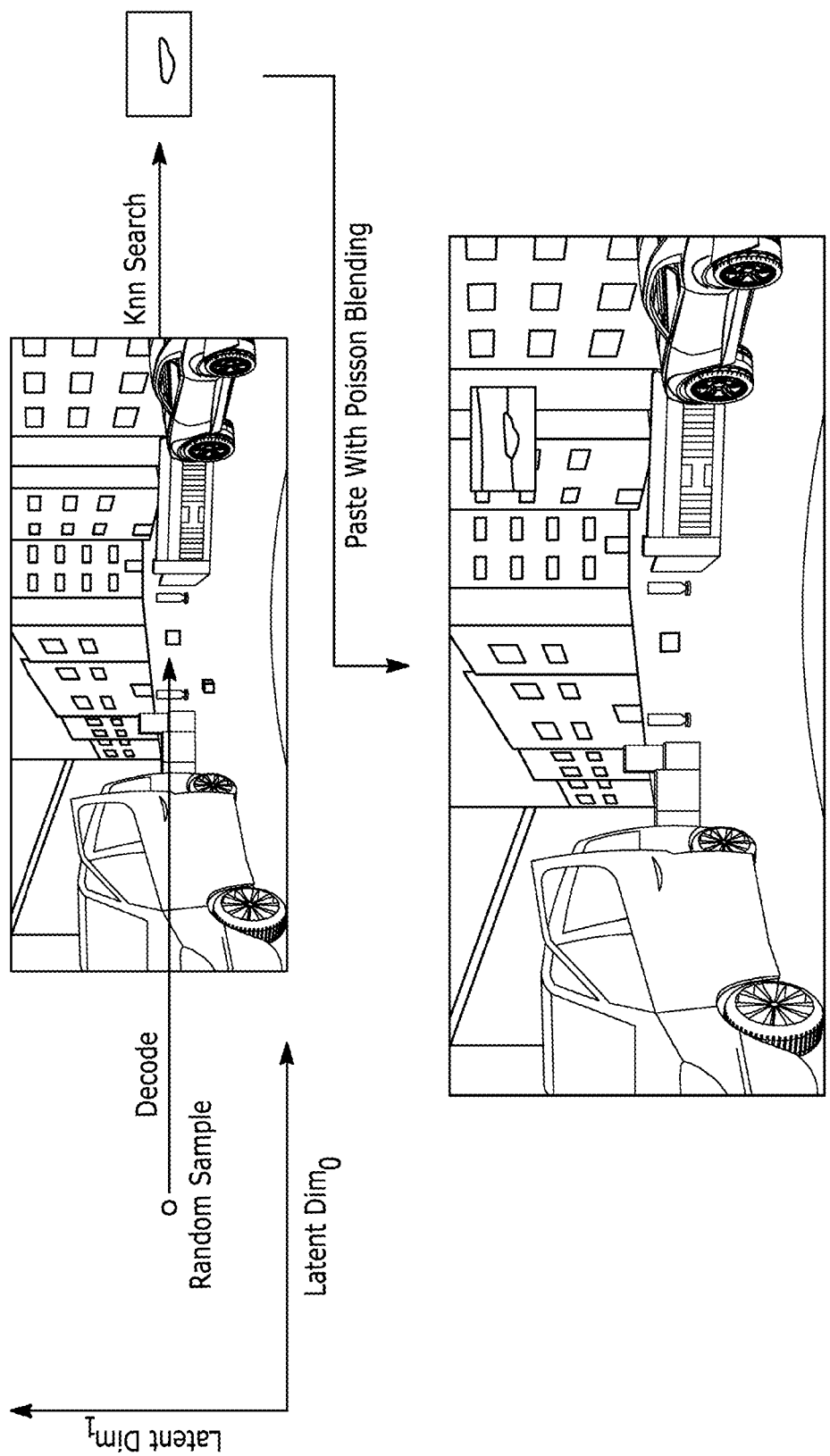
FIG. 7 illustrates generating a new moveable object according to some embodiments.

In some embodiments, with reference to FIG. 7, the electronic processor 200 generates and inserts the new moveable object by determining a spatial representation (for example, a position and size) of a moveable object currently in a given driving scene (for example, the driving scene 240). The electronic processor 200 may determine the spatial representation of the moveable object by sampling a latent representation for the driving scene 240. After determining the spatial representation of the moveable object, the electronic processor 200 may obtain a corresponding bounding box for the moveable object. The electronic processor 200 may obtain the corresponding bounding box using the trained decoder. The electronic processor 200 then selects or determines a new moveable object to be inserted into the corresponding bounding box. In some embodiments, the electronic processor 200 may select or determine the new moveable object by searching for a new moveable object with the most similar bounding box in the collection or set of driving scenes 240. Once the new moveable object is selected or determined, the electronic processor 200 inserts the new moveable object into the driving scene (for example, using a cut and paste approach). In some embodiments, the electronic processor 200 uses Poisson blending, Gaussian blending, or a combination thereof to blend the new moveable object into the driving scene such that the new moveable object is seamlessly inserted into the driving scene.

In some embodiments, a newly generated moveable objects may not fail a target deep learning model directly. Therefore, in some embodiments, the electronic processor 200 perturbs a spatial representation (i.e., a position and a size) of the new moveable object(s) within the driving scene 240 such that the new moveable object(s) fail the deep learning model (as an adversarial generation or attack). In such embodiments, the electronic processor 200 perturbs the spatial representation of the new moveable object by generating a set of new moveable objects. In some embodiments, given the latent representation of a moveable object, the electronic processor 200 samples a set of latent vectors around the moveable object and generates the set of new movable objects. The electronic processor 200 may generate the set of new movable objects in a similar manner as described above with respect to generating and inserting the new moveable object into the driving scene (for example, inserting the new moveable object into a corresponding bounding box). After generating the set of new moveable objects, the electronic processor 200 determines a performance of the deep learning model by applying the deep learning model to the set of new moveable objects. In some embodiments, the performance of the deep learning model is determined as an intersect over union evaluation metric. The electronic processor 200 then uses the performance evaluation to estimate a gradient of the latent representation, where the gradient points towards a direction that the deep learning model experiences a performance drop. The electronic processor 200 may move the latent representation along the gradient (for example, iteratively) until an adversarial example is found. Alternatively or in addition, the electronic processor 200 may move the latent representation along the gradient until a limited query budget is met. Accordingly, in some embodiments, the electronic processor 200 determines one or more adversarial examples based on the performance of the deep learning model on the set of new moveable objects.

As seen in FIG. 4, the method 400 also includes retraining, with the electronic processor 200, the deep learning model using the adversarial example and the training data 240 (at block 420). With the generated adversarial example(s), the accuracy and robustness of the target deep learning model may be improved by retraining the deep learning model with the original collection or set of driving scenes 240 and the generated adversarial example(s). For example, FIG. 8 illustrates a table showing the accuracy and robustness of a semantic segmentation model (i.e., as the deep learning model) trained on a lost cargo dataset (i.e., as the collection or set of driving scenes 240). As seen in FIG. 8, when the adversarial attack results (i.e., the generated adversarial example(s)) are mixed with the original data, the accuracy and the robustness of the semantic segmentation model increases.

In some embodiments, the electronic processor 200 also generates a visual summary of the adversarial attack results for display to an end user (for example, via a display device of the user device 105). The visual summary may include, for example, a robustness quantification for the deep learning model, a visualization or summarization of the adversarial attack patterns, and the like. In some embodiments, the robustness quantification is a ratio of a performance drop of the adversarial example over an amount of change for the adversarial example in latent space. With respect to the visualization or summarization of the adversarial attack patterns, by grouping and visualizing adversarial attack directions (i.e., a gradient of the latent representations), common adversarial attack patterns may be identified.

Figure 9:
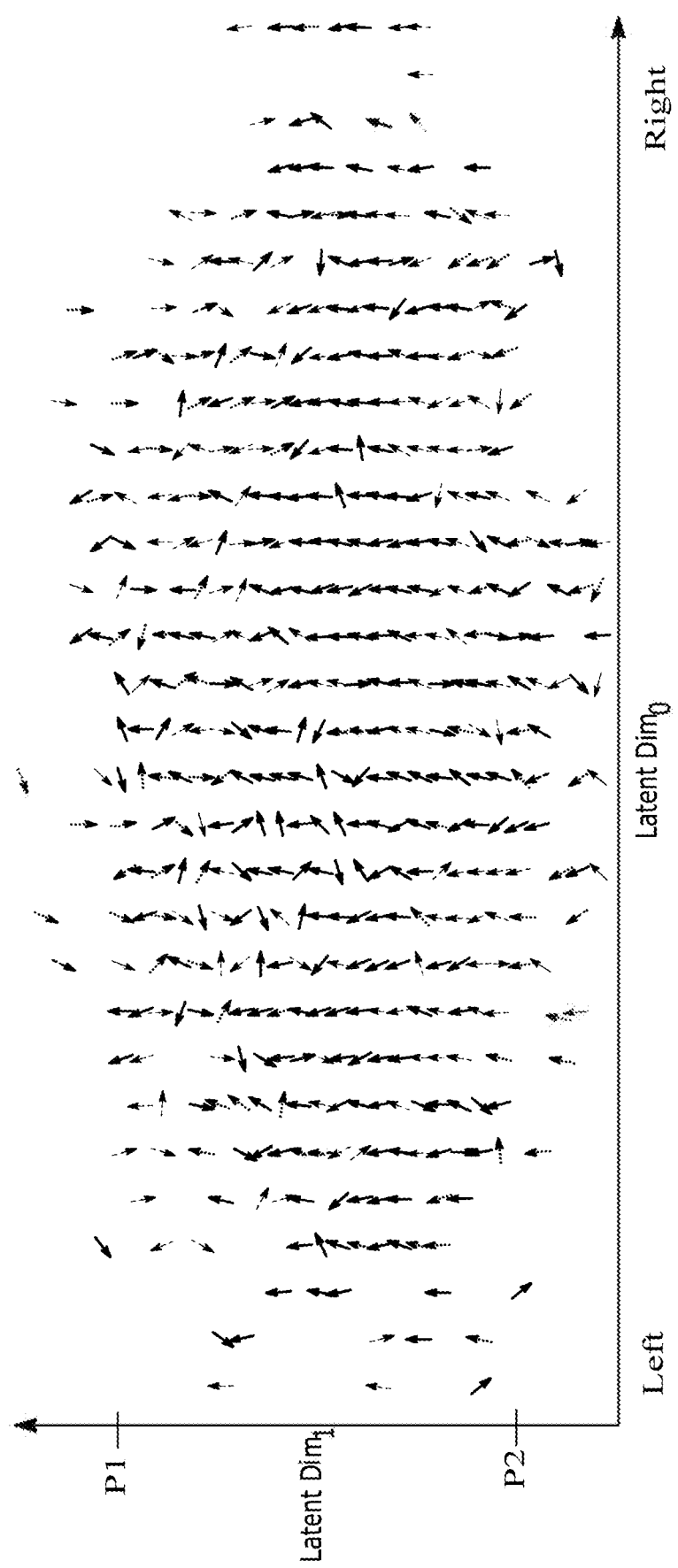
FIG. 9 illustrates an example visualization of a summarization of adversarial attack directions according to some embodiments.

As one example, FIG. 9 illustrates an example visualization of a summarization of adversarial attack directions. As seen in the illustrated example, the visualization includes two axes, a "latent dimo" axis and a "latent dimi" axis. The two axes are the latent dimensions learned from the data to represent special representations (for example, location and size). The latent dimi axis indicates a distance from a current viewpoint, where an increase is axis position represents an increase in distance from a current viewpoint. For example, with reference to FIG. 9, a first axis point P1 has a first distance value and a second axis point P2 has a second distance value, where the first distance value is larger than the second distance value. The latent dimo axis indicates the left and right side of the object located in a driving scene. As also seen in the illustrated example, the visualization includes a plurality of arrows representing a direction the adversarial attack may fail the target model (for example, an arrow points to the location where an adversarial attack may place an object without being detected by the target model). In some embodiments, the arrows are visually distinct (for example, a different color, a different length, a different formatting characteristic) to represent a speed at which the adversarial attack will fail the target model (for example, the fastest direction the adversarial attack may break the target model being tested). In some embodiments, the arrows are represented in different colors. Each color may represent the intersection over union ("IoU") of a target object after an adversarial attack. As one example, a red arrow may represent that the IoU is low, which indicates that the target model fails to detect the object correctly. As another example, a green arrow may represent that the IoU is high, which indicates that the object is detected by the target model after an adversarial attack. Alternatively, or in addition, as depicted in FIG. 9, the arrows may be represented by a different formatting characteristic, such as a line thickness or dash thickness. As one example, as illustrated in the example of FIG. 9, the visualization includes arrows with dots, thinner lines with dashes, thicker lines, thinner lines, and thicker lines with dashes. In such embodiments, the formatting characteristic may represent the IoU of a target object after an adversarial attack. As one example, a solid thick arrow may represent that the IoU is low, which indicates that the target model fails to detect the object correctly. As another example, a dotted arrow may represent that the IoU is high, which indicates that the object is detected by the target model after an adversarial attack.

Accordingly, embodiments described herein relate to function testing of deep learning models that detect or segment movable objects (for example, lost cargo) from drive scenes. Given a collection of drive scenes with movable objects, the embodiments described herein learn the spatial representation of a position and a size of a moveable object (conditioned on given drive scenes). The embodiments then use the learned spatial representation to guide the insertion of new moveable objects into the drive scenes and perturb the position and the size of the new moveable objects to generate adversarial examples. The embodiments use the generated adversarial examples to test and retrain the target deep learning model.

Thus, the embodiments provide, among other things, methods and systems for performing function testing for moveable objects in automated driving with spatial representation learning and adversarial generation. Various features and advantages of certain embodiments are set forth in the following claims.

What is claimed is:

1. A system for performing function testing for moveable objects, the system comprising:
   an electronic processor configured to
   access a driving scene including a moveable object,
   perform spatial representation learning on the driving scene,
   generate an adversarial example based on the learned spatial representation by generating and inserting a new moveable object into the driving scene and perturbing a spatial representation of the new moveable object within the driving scene, and
   retrain a deep learning model using the adversarial example and the driving scene.

2. The system of claim 1, wherein the electronic processor is configured to perform the spatial representation learning using a conditional variational autoencoder.

3. The system of claim 1, wherein the spatial representation learning includes
   training an encoder configured to encode a bounding box of the moveable object included in the driving scene into a latent representation, and
   training a decoder configured to reconstruct the bounding box given the latent representation and the driving scene.

4. The system of claim 1, wherein the deep learning model is a semantic segmentation model.

5. The system of claim 1, wherein the deep learning model identifies a bounding box representing the moveable object included in the driving scene.

6. The system of claim 1, wherein the electronic processor is configured to generate and insert the new moveable object by
   determining a spatial representation of the moveable object in the driving scene by sampling a latent representation for the driving scene,
   selecting the new moveable object based on a similarity of the new moveable object with the moveable object of the driving scene, and
   inserting the new moveable object into the driving scene as a new driving scene.

7. The system of claim 6, wherein the electronic processor is further configured to
   obtain, using a decoder, a corresponding bounding box for the moveable object,
   wherein the new moveable object is inserted into the corresponding bounding box.

8. The system of claim 6, wherein the electronic processor is configured to blend the new moveable object into the driving scene.

9. The system of claim 1, wherein the electronic processor is configured to perturb the spatial representation of the new moveable object by
   generating a set of new moveable objects,
   determining a performance of the deep learning model by applying the deep learning model to the set of new moveable objects, and
   determining the adversarial example based on the performance of the deep learning model on the set of new moveable objects.

10. The system of claim 9, wherein the adversarial example includes a new moveable object from the set of new moveable objects.

11. A method for performing function testing for moveable objects, the method comprising:
    accessing a driving scene including a moveable object;
    performing, with an electronic processor, spatial representation learning on the driving scene;
    generating, with the electronic processor, an adversarial example based on the learned spatial representation learning by generating and inserting a new moveable object into the driving scene and perturbing a spatial representation of the new moveable object within the driving scene; and
    retraining, with the electronic processor, the deep learning model using the adversarial example and the driving scene.

12. The method of claim 11, wherein performing the spatial representation learning includes
    training an encoder configured to encode a bounding box of the moveable object included in the driving scene into a latent representation, and
    training a decoder configured to reconstruct the bounding box given the latent representations and the driving scene.

13. The method of claim 11, wherein generating and inserting the new moveable object includes determining a spatial representation of the moveable object included in the driving scene by sampling a latent representation for the driving scene,
selecting the new moveable object based on a similarity of the new moveable object with the moveable object of the driving scene, and
inserting the new moveable object into the driving scene as a new driving scene.

14. The method of claim 13, further comprising:
obtain, using a decoder, a corresponding bounding box for the moveable object,
wherein the new moveable object is inserted into the corresponding bounding box.

15. The method of claim 11, wherein perturbing the spatial representation of the new moveable object includes generating a set of new moveable objects,
determining a performance of the deep learning model by applying the deep learning model to the set of new moveable objects, and
determining the adversarial example based on the performance of the deep learning model on the set of new moveable objects.

16. The method of claim 11, further comprising:
generating a visual summary for display, the visual summary including at least one selected from a group consisting of a robustness quantification for the deep learning model and a summarization of adversarial attack patterns.

17. The method of claim 16, further comprising:
determining the robustness quantification for the deep learning model, wherein the robustness quantification is a ratio of a performance drop of the adversarial example over an amount of change for the adversarial example in latent space.

18. A non-transitory, computer-readable medium storing instructions that, when executed by an electronic processor, perform a set of functions, the set of functions comprising:
accessing a driving scene including a moveable object;
performing spatial representation learning on the driving scene by generating and inserting a new moveable object into the driving scene and perturbing a spatial representation of the new moveable object within the driving scene;
generating an adversarial example based on the learned spatial representation; and
retraining the deep learning model using the adversarial example and the driving scene.

* * * * *